(12) United States Patent
Carter et al.

(10) Patent No.: US 11,655,160 B2
(45) Date of Patent: May 23, 2023

(54) TUNGSTEN OXIDE-BASED MATERIAL

(71) Applicant: WILLIAM BLYTHE LIMITED, Essex (GB)

(72) Inventors: Mark Carter, Essex (GB); Jack Carroll, Essex (GB); David Crossley, Essex (GB)

(73) Assignee: WILLIAM BLYTHE LIMITED, Essex (GB)

( * ) Notice: Subject to any disclaimer, the term of this patent is extended or adjusted under 35 U.S.C. 154(b) by 768 days.

(21) Appl. No.: 16/610,570

(22) PCT Filed: Feb. 2, 2018

(86) PCT No.: PCT/GB2018/050315
§ 371 (c)(1),
(2) Date: Nov. 4, 2019

(87) PCT Pub. No.: WO2018/203025
PCT Pub. Date: Nov. 8, 2018

(65) Prior Publication Data
US 2020/0087163 A1 Mar. 19, 2020

(30) Foreign Application Priority Data
May 5, 2017 (GB) ..................... 1707253

(51) Int. Cl.
C01G 41/00 (2006.01)
(52) U.S. Cl.
CPC ........ C01G 41/006 (2013.01); *C01P 2002/54* (2013.01); *C01P 2002/70* (2013.01)
(58) Field of Classification Search
CPC .................................................. C01G 41/006
See application file for complete search history.

(56) References Cited

U.S. PATENT DOCUMENTS

| | | | |
|---|---|---|---|
| 6,048,621 A | 4/2000 | Gallego et al. | |
| 7,011,691 B2 | 3/2006 | Abe | |
| 7,569,167 B2 | 8/2009 | Abe | |
| 7,687,141 B2 | 3/2010 | Yabuki | |
| 8,083,847 B2 | 12/2011 | Takeda et al. | |
| 8,980,135 B2 | 3/2015 | Takeda et al. | |
| 2005/0271566 A1 | 12/2005 | Yadav | |
| 2006/0178254 A1 | 8/2006 | Takeda et al. | |
| 2006/0209383 A1 | 9/2006 | Burdis et al. | |
| 2007/0187653 A1 | 8/2007 | Takeda et al. | |
| 2010/0140533 A1 | 6/2010 | Fujita | |
| 2010/0219654 A1 | 9/2010 | Fujita | |
| 2011/0143116 A1 | 6/2011 | Chung et al. | |
| 2012/0138842 A1 | 6/2012 | Fu et al. | |
| 2013/0200292 A1 | 8/2013 | Fung et al. | |
| 2014/0242381 A1 | 8/2014 | Fu et al. | |
| 2014/0377567 A1 | 12/2014 | Ii et al. | |
| 2015/0153478 A1 | 6/2015 | Takeda et al. | |
| 2016/0122524 A1 | 5/2016 | Machida et al. | |
| 2016/0160052 A1 | 6/2016 | Su et al. | |
| 2016/0178804 A1 | 6/2016 | Shen et al. | |
| 2016/0346768 A1 | 12/2016 | Wrobel et al. | |
| 2017/0131446 A1 | 5/2017 | Fujita | |

FOREIGN PATENT DOCUMENTS

| | | |
|---|---|---|
| AU | 2011253581 A1 | 12/2011 |
| CN | 102963933 A | 3/2013 |
| CN | 103449526 A | 12/2013 |
| CN | 104341007 A | 2/2015 |
| CN | 104445416 A | 3/2015 |
| CN | 104828868 A | 8/2015 |
| CN | 105680021 A | 6/2016 |
| CN | 107083161 A | 8/2017 |
| CN | 107200357 A | 9/2017 |
| CS | 258950 B1 | 9/1988 |
| DE | 102015209638 A1 | 7/2016 |
| EP | 2143762 A1 | 1/2010 |
| JP | H01172325 A | 7/1989 |
| JP | H09111186 A | 4/1997 |
| JP | 2004043851 A | 2/2004 |
| JP | 2007314752 A | 12/2007 |

(Continued)

OTHER PUBLICATIONS

Chintalapalle et al, TMS2015 Annual Meeting & Exhibition, "Evaluation of Titanium and Nitrogen Doped Tungsten Oxide Thin Films for Application in Solar Energy Conversion," 2015.

Gier et al, "New Lithium, Ammonium, and Tin Hexagonal Tungsten Bronzes Prepared Hydrothermally," Notes, E.I. Du Pont Dr Nemours and Co., 1968, vol. 7:8, pp. 1646-1647.

Guo et al, "Synthesis of W18O49 Nanorod via Ammonium Tungsten Oxide and Its Interesting Optical Properties," Langmuir, 2011, vol. 27:19, pp. 12172-12178.

(Continued)

*Primary Examiner* — James A Fiorito
(74) *Attorney, Agent, or Firm* — Kilyk & Bowersox, P.L.L.C.

(57) ABSTRACT

A material of Formula (I) is provided $$M_yT_xQ_vW_{1-v}O_{z-t}J_t \qquad (I)$$

where:
T represents one of tin, lead, antimony and germanium, T being present in the interstitial spaces or voids of the lattice, M represents one or more species, each selected from the group consisting of (i) metals other than T, and (ii) polyatomic ionic species, said polyatomic species having an ionic radius of no more than 2 Å, M being present in the interstitial spaces or voids of the lattice,
W is tungsten,
O is oxygen,
Q represents one or more element having an oxidation state of at least +4, Q, if present, occupying a lattice point of W,
J represents one or more non-metallic element anion of chemical valence −1, J, if present, occupying a lattice point of O,
v is from 0 to 1.0, t is from 0 to 3.0, y is non-zero and up to and including 0.32, x is non-zero and up to and including 0.32, and z is from 2.5 to 4, provided that x+y≤0.33.

19 Claims, No Drawings

(56) References Cited

FOREIGN PATENT DOCUMENTS

| | | |
|---|---|---|
| JP | 2010075775 A | 4/2010 |
| JP | 4586970 B2 | 11/2010 |
| JP | 5034272 B2 | 9/2012 |
| JP | 5070796 B2 | 11/2012 |
| JP | 5136832 B2 | 2/2013 |
| JP | 5234237 B2 | 7/2013 |
| JP | 5343697 B2 | 11/2013 |
| JP | 2015105328 A | 6/2015 |
| JP | 2015117353 A | 6/2015 |
| JP | 2016029165 A | 3/2016 |
| JP | 20177889 A | 1/2017 |
| JP | 6217353 B2 | 10/2017 |
| JP | 6225670 B2 | 11/2017 |
| KR | 101458831 B1 | 11/2014 |
| TW | I291455 B | 12/2007 |
| WO | 2005037932 A1 | 4/2005 |
| WO | 2006025470 A1 | 3/2006 |
| WO | 2006049025 A1 | 5/2006 |
| WO | 2015010575 A1 | 1/2015 |
| WO | 2015010757 A1 | 1/2015 |
| WO | 2016010156 A1 | 1/2016 |
| WO | 2016121844 A1 | 7/2016 |
| WO | 2016121843 A1 | 8/2016 |
| WO | 2017073691 A1 | 5/2017 |
| WO | 2018020819 A1 | 2/2018 |
| WO | 2018123096 A1 | 7/2018 |
| WO | 2018203026 A1 | 11/2018 |

OTHER PUBLICATIONS

Lee et al, "Facile fabrication of high-efficiency near-infrared absorption film with tungsten bronze nanoparticle dense layer," Nanoscale Research Letters, 2014, vol. 9(1):294.

Neri et al, "Tungsten Oxide Nanowires-Based Ammonia Gas Sensors," Sensor Letters, Aug. 2008, vol. 6(4), pp. 590-595.

Szalay et al, "Ion exchange adsorption processes on the surface of ammonium tungsten oxide bronze in aqueous media," Journal of Materials Science, 1987, vol. 22:10, pp. 3543-3546.

UKIPO Search Report dated Oct. 31, 2017 issued in corresponding GB Application No. GB1707255.4.

UKIPO Search Report dated Oct. 31, 2017 issued in corresponding GB Application No. GB1707253.9.

PCT Search Report and Written Opinion dated Mar. 27, 2018 issued in corresponding International Application No. PCT/GB2018/050315.

PCT Search Report and Written Opinion dated Apr. 10, 2018 issued in corresponding International Application No. PCT/GB2018/050316.

TUNGSTEN OXIDE-BASED MATERIAL

This application is a National Stage Application of PCT/GB2018/050315, filed Feb. 2, 2018, which claims priority to United Kingdom Patent Application No. 1707253.9, filed May 5, 2017.

BACKGROUND OF THE INVENTION

The present disclosure relates to a tungsten oxide.

The present invention concerns a tungsten oxide. More particularly, but not exclusively, this invention further concerns a composition comprising a tungsten oxide and a method of making a tungsten oxide.

Tungsten oxides incorporating a polyatomic cation (such as ammonium) or a metal (such as tin) are known. Some such tungsten oxides absorb infra-red (IR) radiation and are therefore used to provide IR absorbing properties, although some tungsten oxides do not provide good IR absorbing properties. Some tungsten oxides absorb light in the visible part of the spectrum which may be undesirable in certain circumstances where it is desired that the tungsten oxide does not have a significant deleterious effect on the visible colour of the matrix in which the tungsten oxide is dispersed.

The present invention seeks to mitigate one or more of the above-mentioned problems. Alternatively or additionally, the present invention seeks to provide an improved tungsten oxide.

SUMMARY OF THE INVENTION

In accordance with a first aspect of the present invention, there is provided a material of Formula (I)

$$M_yT_xQ_vW_{1-v}O_{z-t}J_t \quad (I)$$

Where:
T represents one of tin, lead, germanium and antimony, T being present in the interstitial spaces or voids of the lattice,
M represents one or more species, each selected from the group consisting of (i) metals other than T, and (ii) polyatomic ionic species, said polyatomic species having an ionic radius of no more than 2 Å, M being present in the interstitial spaces or voids of the lattice,
W is tungsten,
O is oxygen,
Q represents one or more element having an oxidation state of at least +4, Q, if present, occupying a lattice point of W,
J represents one or more non-metallic element anion of chemical valence $-1$, J, if present, occupying a lattice point of O,
v is from 0 to 1.0, t is from 0 to 3.0, y is non-zero and up to and including 0.32, x is non-zero and up to and including 0.32, and z is from 2.5 to 4, provided that $x+y \leq 0.33$.

The material of the first aspect of the present invention may provide IR absorbance properties. The presence of tin, lead, antimony or germanium in combination with other dopants may provide a material with IR absorbance properties.

Tungsten may be present in more than one oxidation state.

T is typically present as an ion.

T optionally represents one of tin, lead or germanium.

T optionally represents antimony.

T optionally represents one of tin and lead, optionally one of tin and germanium, T optionally represents tin. T optionally represents lead. T optionally represents germanium. For the avoidance of doubt, the material may comprise more than one of Sn, Pb, Ge and Sb; in this case, T would be provided by one of Sn, Ge, Pb and Sb, and another of Sn, Ge, Pb and Sb would be M.

Optionally, v is zero and therefore Q is not present. v may be non-zero. v is optionally no more than 0.8, optionally no more than 0.6, optionally no more than 0.5, optionally no more than 0.3, optionally no more than 0.2, optionally no more than 0.1 and optionally no more than 0.05. v may be from 0 to 0.1, optionally from 0 to 0.05, optionally from 0.01 to 0.05 and optionally from 0.01 to 0.03. It has been found that relatively small amounts of lattice substituents for W may be incorporated into the material without significantly adversely affecting the IR absorbance properties of the material.

Optionally, t is zero and therefore J is not present. t may be non-zero. t is optionally no more than 2.0, optionally no more than 1.5, optionally no more than 1.0 and optionally no more than 0.5.

J may represent one or more of F, Cl, Br and I.

Q optionally comprises (or optionally represents) one or more (and optionally one) of Nb, Mo, Ta, Sn, Ti, Zr, Hf, V, Re, Bi, Sb, As, P, Pb, Ge, Si, U and Mn. Q optionally comprises (or optionally represents) one or more (and optionally one) of Nb, Mo, Ta, Sn, Ti, Zr, Hf, Sb, As and P. Q optionally comprises (or optionally represents) one or more (and optionally one) of Nb, Mo, Ta, Ti, Zr and Hf. Q optionally comprises (or optionally represents) one or more (and optionally one) of Nb, Mo and Ta.

Optionally x is at least 0.02, optionally at least 0.03, optionally at least 0.05, optionally at least 0.10, optionally at least 0.13, optionally at least 0.15, optionally at least 0.18, optionally at least 0.20 and optionally at least 0.25. Optionally, x is no more than 0.30, optionally no more than 0.28, optionally no more than 0.25, optionally no more than 0.20, optionally no more than 0.18 and optionally no more than 0.15.

Optionally, x is from 0.02 to 0.20, optionally from 0.03 to 0.20, optionally from 0.05 to 0.20, optionally from 0.10 to 0.20, optionally from 0.10 to 0.18 and optionally from 0.10 to 0.16. It has been found that certain materials with x being from 0.10 to 0.18 (in particular, from 0.10 to 0.16) provide suitable IR absorbance characteristics. In certain cases, x is optionally from 0.02 to 0.10, optionally from 0.02 to 0.08, optionally from 0.02 to 0.08, and optionally 0.03 to 0.06.

Optionally, y is at least 0.05, optionally at least 0.08, optionally at least 0.12, optionally at least 0.15 and optionally at least 0.16. Optionally, y is no more than 0.30, optionally no more than 0.28, optionally no more than 0.25, optionally no more than 0.22, optionally no more than 0.20, optionally no more than 0.18, optionally no more than 0.15 and optionally no more than 0.10.

Optionally, y is from 0.10 to 0.30, optionally from 0.10 to 0.28, optionally from 0.14 to 0.23, optionally from 0.15 to 0.23 and optionally from 0.16 to 0.23. In certain cases, y is optionally from 0.20 to 0.30, optionally from 0.22 to 0.30, optionally from 0.24 to 0.30, and optionally from 0.24 to 0.30. It has been found that certain materials in which y is from 0.20 to 0.30 provide suitable IR absorbance properties.

y refers to the total content of M. For the avoidance of doubt, M may represent more than one species. For example, if M represents n species, where n is 2 or more, M1, M2, . . . Mn, then M represents $M1_{y1}, M2_{y2}, \ldots Mn_{yn}$, where $x = \Sigma(y1, y2, \ldots yn)$. For example, if M represents two species, M1 and M2, then M represents $M1_{y1}M2_{y2}$ and $y = y1+y2$.

Optionally, $x+y \geq 0.15$, optionally $x+y \geq 0.18$, optionally $x+y \geq 0.20$, optionally $x+y \geq 0.23$, optionally $x+y \geq 0.25$, optionally x+y≥0.28, optionally x+y≥0.30, optionally x+y≥0.31, optionally x+y≥0.32 and optionally x+y=0.33. It is preferred that substantially all of the interstitial sites are filled.

M optionally represents one or more species. M may represent a Group I metal. M may represent a Group II metal. M may represent a polyatomic species having an ionic radius of no more than 2 Å, such as ammonium. M may represent one or more monoatomic metal species (such as one or more Group I metal species) in combination with a polyatomic species having an ionic radius of no more than 2 Å (such as $NH_4^+$). M may represent a plurality of monoatomic metal species, for example, two monoatomic metal species, each metal species optionally being selected from the group consisting of Group I metals (often known as alkali metals) and Group II metals (often known as alkaline earth metals), and each of M optionally being present as an ion.

M may comprise (or optionally represent) one or more of: alkali metal, alkaline earth metal, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, Te, Ti, Nb, V, Mo, Ta, Re, Be, Hf, Os and Bi, optionally as an ion. For the avoidance of doubt, T represents one of Ge, Sn and Pb, and therefore M may comprise one or more of another of Ge, Sn and Pb which is not represented by T.

M may comprise one or more Group I metal, optionally as an ion, optionally in combination with a further monoatomic species, such as a monoatomic metal species or a polyatomic species having an ionic radius of no more than 2 Å. M may comprise one or more of Li, Na, K, Cs and Rb, optionally in ionic form, optionally in combination with a further monoatomic species, such as a monoatomic metal species, such as a monoatomic metal ion. M may comprise Na and at least one other Group I metal, optionally in ionic form, or a polyatomic species having an ionic radius of no more than 2 Å.

M may optionally represent one or more Group I metal, optionally in combination with a polyatomic species (in particular, ammonium) having an ionic radius of no more than 2.0 Å. Optionally, M represents one or more Group I metal, optionally more than one Group I metal, optionally two Group I metals. If M represents two Group I metals, then the two Group I metals may be in any ratio.

M may comprise one or more Group II metal, optionally as an ion, optionally in combination with a further monoatomic species, such as a monoatomic metal species or a polyatomic species having an ionic radius of no more than 2 Å. M may comprise one or more of Mg, Ca and Sr, optionally in ionic form, optionally in combination with a further monoatomic species, such as a monoatomic metal species, such as a monoatomic metal ion.

M may comprise one or more of Ag, Tl, In and Cu, optionally as an ion, optionally in combination with a further monoatomic species, such as a monoatomic metal species or a polyatomic species having an ionic radius of no more than 2 Å.

M may represent one or more Group I metal, optionally as an ion, optionally only one Group I metal, optionally in combination with a further monoatomic species, such as a monoatomic metal species (such as a Group II metal) or a polyatomic species having an ionic radius of no more than 2 Å. M may therefore represent a Group I metal (optionally sodium, potassium, rubidium or caesium) and a polyatomic species having an ionic radius of no more than 2 Å. M may represent a Group I metal (optionally sodium, potassium, rubidium or caesium). M may represent a Group I metal in combination with a Group II metal. M may represent a plurality of Group I metals, optionally two Group I metals. It has been found that Group I (alkali) metals may provide materials with suitable IR absorbing properties.

M may represent one or more Group II metal, optionally as an ion, optionally only one Group I metal, optionally in combination with a further monoatomic species, such as a monoatomic metal species (such as a Group I metal) or a polyatomic species having an ionic radius of no more than 2 Å. M may therefore represent a Group II metal (optionally magnesium, calcium, barium or strontium) and a polyatomic species having an ionic radius of no more than 2 Å. M may represent a Group II metal (optionally magnesium, calcium or strontium). M may represent a Group I metal in combination with a Group II metal. Optionally, M may represent a plurality of Group II metals, optionally two Group II metals.

M may represent one or more of Ag, Tl, In and Cu, optionally as an ion, optionally only one of Ag, Tl, In and Cu, optionally in combination with a further monoatomic species, such as a monoatomic metal species (such as a Group II metal) or a polyatomic species having an ionic radius of no more than 2 Å. M may therefore represent one of Tl, Ag, In and Cu, and a polyatomic species having an ionic radius of no more than 2 Å. M may represent one of Tl, In, Ag and Cu. M may represent a plurality of species selected from the group consisting of Tl, In, Ag and Cu.

The material of formula (I) may be of formula (II), where y is from 0.14 to 0.30, optionally from 0.14 to 0.28, optionally from 0.14 to 0.24, and optionally from 0.20 to 0.30; x is from 0.10 to 0.18, optionally from 0.10 to 0.16, v is from 0 to 0.05, t is from 0 to 0.10 (optionally from 0 to 0.05), and M optionally represents one or more of Group I metal, Group II metal and a polyatomic species having an ionic radius of no more than 2 Å (particularly ammonium); optionally M represents one or more Group I metal; optionally two Group I metals and optionally one or more Group I metal and a polyatomic species having an ionic radius of no more than 2 Å (typically ammonium). If M represents one or more Group I metal and said polyatomic species, then the molar ratio of said Group I metal to said polyatomic species may optionally be at least 10:1, optionally at least 8:1, optionally at least 5:1, optionally at least 4:1 and optionally at least 2:1.

Q optionally represents one or more of zirconium, niobium, molybdenum and tantalum, optionally one of niobium, zirconium, molybdenum and tantalum.

As mentioned above, M may comprise a polyatomic species having an ionic radius of no more than 2 Å, such as one or more of $NH_4^+$, $H_3O^+$, $VO^{2+}$, $H_2F^+$ and $H_3S^+$, in particular ammonium. For example, M may represent ammonium and one other species, such as a Group I metal.

Optionally, z may be from 2.5 to 3.5, optionally from 2.5 to 3.2 and optionally from 2.7 to 3.1 and optionally from 2.9 to 3.1. Optionally, z may be at least 2.7, optionally at least 2.8, optionally at least 3.0 and optionally at least 3.2. Optionally, z may be no more than 3.5 and may optionally be up to and including 3.3. Optionally, z may be about 3.

Optionally, x is from 0.03 to 0.13 (optionally from 0.05 to 0.11); v is from 0 to 0.04 (optionally from 0 to 0.03, optionally 0, 0.02 or 0.03), with Q being Nb, Mo or Ta; t is zero (and therefore J is not present); z is from 2.9 to 3.1 (optionally 3.0); y is from 0.20 to 0.30 (optionally from 0.22 to 0.28), with M representing one or more of (and optionally one of) Na, K, Cs and ammonium.

The tungsten oxide of the first aspect of the present invention is a single phase material, not a mixture or blend of a plurality of different materials, or a monoatomic species or polyatomic species merely blended into a carrier, such as $WO_3$. This may be demonstrated using x-ray diffraction. The single phase material will typically generate a diffraction pattern characteristic of that material. A mixture or blend of different materials will generate an x-ray diffraction pattern for each different material. Similarly, if a monoatomic material is blended into a carrier, such as $WO_3$, one would expect to observe an x-ray diffraction pattern from the carrier and possibly an x-ray diffraction pattern from the monoatomic material.

In accordance with a second aspect of the present invention, there is provided a composition comprising a material of Formula (I) dispersed in a carrier.

The carrier may, for example, comprise an evaporable liquid, such as those used in coatings. The evaporable liquid may be aqueous or non-aqueous. The word "evaporable" indicates that the liquid (or a sufficiently large proportion thereof) evaporates in the conditions in which the composition is to be used, typically to provide a coating. For example, "evaporable" may indicate that, in use, the liquid evaporates at 20° C. in a period of no more than 12 hours, optionally to provide a coating.

The carrier may, for example, comprise a binder.

The carrier may optionally be liquid or solid. The carrier may be a liquid which is treatable so as to form a solid. The subsequently-formed solid may comprise the material of Formula (I) dispersed in said solid.

The amount of material of Formula (I) dispersed in the carrier will depend on the intended use of the composition. Optionally, sufficient material of Formula (I) is present to provide effective infra-red (IR) absorption/shielding characteristics. Such absorption/shielding characteristics may optionally be measured at a nominal wavelength of 1039 nm.

In accordance with a third aspect of the present invention, there is provided a method of making a material of Formula (I), the method comprising providing in admixture species T (or a source thereof), species M (or a source thereof), optionally species Q (or a source thereof), optionally species J (or a source thereof) and a source of $WO_{z-t}$. The source of $WO_{z-t}$ may also provide one or more of species M.

The source of $WO_{z-t}$ may comprise a tungsten (VI) species and a reducing agent, such as a reducing acid, such as lactic acid or citric acid, optionally lactic acid.

The source of $WO_{z-t}$ may comprise tungstic acid, a metatungstate, a paratungstate or a tungstate ($WO_4^{2-}$). Tungstic acid may be provided, for example, by passing a tungstate through an ion exchange resin.

T (or a source thereof), species M (or a source thereof), optionally species Q (or a source thereof), optionally species J (or a source thereof) and a source of $WO_{z-t}$ are optionally provided in admixture in acidic conditions, optionally at a pH of no more than 3, optionally no more than 2.5, optionally no more than 2, optionally no more than 1.5 and optionally from 1.0 to 1.5.

The method may comprise heating said admixture to form a product. The admixture may be heated for at least 5 hours, optionally for at least 20 hours, optionally for at least 30 hours, optionally for at least 40 hours, optionally for at least 50 hours, optionally at least 60 hours and optionally at least 70 hours.

The method may comprise heating said admixture for no more than 90 hours, optionally no more than 80 hours, optionally no more than 70 hours, optionally no more than 60 hours, optionally no more than 50 hours and optionally no more than 40 hours.

The method may comprise heating said admixture for 5-100 hours, optionally for 20-90 hours and optionally for 40-80 hours.

The method may comprise heating the admixture to a temperature of at least 100° C., optionally at least 120° C., optionally at least 140° C., optionally at least 150° C., optionally at least 160° C., optionally at least 170° C., optionally at least 180° C. and optionally at least 190° C.

The method may comprise heating the admixture to a temperature of no more than 250° C., no more than 240° C., no more than 220° C. and optionally no more than 200° C.

The method may comprise heating the admixture to a temperature of 100-220° C., optionally of 140-200° C. and optionally of 150-190° C.

The product so formed may be filtered and/or dried and/or heated in an inert atmosphere. The product so formed is optionally filtered, dried and heated in an inert atmosphere. In the present context, an inert atmosphere is one which does not contain a significant amount of oxygen (such as would oxidise one or more of the components of the material of Formula (I)). Heating in an inert atmosphere may comprise heating to a temperature of at least 100° C., optionally at least 200° C., optionally at least 300° C., optionally at least 400° C. and optionally at least 500° C. Heating in an inert atmosphere may comprise heating to a temperature of no more than 800° C., optionally no more than 700° C., optionally no more than 600° C., optionally no more than 500° C. and optionally no more than 400° C. Heating in an inert atmosphere may comprise heating to a temperature of 100-800° C. and optionally of 100-600° C. Heating in an inert atmosphere may comprise heating for up to 10 hours, optionally up to 8 hours, optionally up to 6 hours, optionally up to 4 hours and optionally up to 2 hours. Heating in an inert atmosphere may comprise heating for at least 0.5 hours and optionally for at least 1 hour. Heating in an inert atmosphere may comprise heating for 0.5-10 hours, for 0.5-6 hours and for 0.5-4 hours.

In accordance with a fourth aspect of the present invention, there is provided a method of providing infrared absorbing capability to an object, the method comprising providing said object with a material of Formula (I).

The method of the fourth aspect of the present invention may comprise providing said object with a composition in accordance with the second aspect of the present invention. The method may comprise applying a liquid composition to said object and then forming a solid composition from the liquid composition. This may comprise, for example, the removal of one or more components of the liquid composition, for example, by evaporation.

It will of course be appreciated that features described in relation to one aspect of the present invention may be incorporated into other aspects of the present invention. For example, the method of the invention may incorporate any of the features described with reference to the material of the invention and vice versa.

Embodiments of the present invention will now be described by way of example only.

DETAILED DESCRIPTION

In the following Examples and Comparative Examples, the sources of the reagents or materials used were as follows: sodium tungstate dihydrate (Alfa Aesar), lactic acid (90%) (Alfa Aesar), lithium carbonate (VWR), sodium carbonate (Solvay), potassium carbonate (VWR), rubidium carbonate (Merck), caesium carbonate (Alfa Aesar), ammonium bicarbonate (VWR), Tin (Royal Metal Powders), potassium sulphate (VWR), sodium molybdate (Norkem), niobium pentoxide (Alfa Aesar), germanium powder (Alfa Aesar), lead nitrate (VWR), potassium tungstate (Alfa Aesar), antimony (Alfa Aesar) and ammonium metatungstate (Alfa Aesar). All reagents or materials were used as supplied.

Comparative Example 1—Tin Reference

Sodium tungstate solution (6.6 g in 100 ml water) was passed through an ion exchange column to form tungstic acid. Lactic acid (90%, 6.03 g, Alfa Aesar) was added, followed by tin powder (0.36 g). The mixture was heated in an autoclave to 150° C. for about 48 hours to afford the product, which is separated by filtration and dried under vacuum to provide a material of expected formula $Sn_{0.2}WO_3$. The composition was confirmed by x-ray fluorescence spectroscopy.

Comparative Example 2—Potassium Reference

Sodium tungstate dihydrate (6.6 g, 0.02 mol) was dissolved in deionised water to a total volume of 100 ml. This solution was passed through an acid form ion exchange resin to produce tungstic acid solution. To this, 6.0 g 90% lactic acid solution was added, followed by potassium sulfate (5.0 g, 0.0287 mol). The suspension was transferred to a 200 ml hydrothermal reaction bomb. This was heated to 190° C. for 72 hours to afford the product which is separated by filtration, dried under vacuum and heated under a flow of nitrogen at 500° C. for 1 hour to provide a material of formula $K_{0.33}WO_3$. The composition was confirmed by x-ray fluorescence spectroscopy.

Comparative Example 3—Caesium Reference

Sodium tungstate dihydrate (6.6 g, 0.02 mol) was dissolved in deionised water to a total volume of 100 ml. This solution was passed through an acid form ion exchange resin to produce tungstic acid solution. To this, 6.0 g 90% lactic acid solution was added, followed by caesium carbonate (2.175 g, 0.00668 mol). The suspension was transferred to a 200 ml hydrothermal reaction bomb. This was heated to 150° C. for 48 hours to afford the product which is separated by filtration, dried under vacuum and heated under a flow of nitrogen at 500° C. for 1 hour to provide a material of formula $Cs_{0.33}WO_3$. The composition was confirmed by x-ray fluorescence spectroscopy.

Comparative Example 4—Ammonium Reference

Sodium tungstate solution (6.6 g in 100 ml water) was passed through an ion exchange column to form tungstic acid. Lactic acid (90%, 6.03 g, Alfa Aesar) was added, followed by ammonium bicarbonate (0.57 g, VWR International). The mixture was heated in an autoclave to 150° C. for about 72 hours to afford the product, which is separated by filtration, dried under vacuum and heated under a flow of nitrogen at 500° C. for 1 hour to provide a material of expected formula $(NH_4)_{0.33}WO_3$.

Comparative Example 5—Caesium Reference

Sodium molybdate (0.48 g) and sodium tungstate dihydrate (12.53 g) were dissolved in 50 ml water and lactic acid (13.5 g) added. Caesium carbonate (2.68 g) was then added to form a clear and colourless solution. 10% sulfuric acid was added dropwise to a pH of 1.1. The mixture was heated in an autoclave to 190° C. for about 48 hours to afford the product, which is separated by filtration, dried under vacuum and heated under a flow of nitrogen at 500° C. for 1 hour to provide a material of expected formula $Cs_{0.33}Mo_{0.03}W_{0.97}O_3$.

Comparative Example 6—Further Caesium Reference

Caesium carbonate (0.24 g) and niobium oxide (0.08 g) were fused at 800° C. to form a clear melt. This melt was dissolved in 20 ml water to form a colourless solution. Further caesium carbonate (1.10 g) was added, followed by lactic acid (6.75 g). Sodium tungstate dihydrate (6.40 g) was dissolved in 80 ml of water and passed through an ion exchange column to form tungstic acid. The caesium niobate solution was then added dropwise with stirring to the tungstic acid solution. The mixture was heated in an autoclave to 190° C. for about 48 hours to afford the product, which is separated by filtration, dried under vacuum and heated under a flow of nitrogen at 500° C. for 1 hour to provide a material of expected formula $Cs_{0.33}Nb_{0.03}W_{97}O_3$.

Comparative Example 7—Potassium/Sodium Reference

Zirconium oxide (0.136 g) was dissolved in lactic acid (12.0 g). Sodium tungstate dihydrate (11.76 g) was dissolved in 50 ml water. The zirconium lactate solution was added to the sodium tungstate solution to form a clear, colourless solution. Potassium carbonate (1.14 g) was then added. 10% sulfuric acid was added dropwise to a pH of 1.1. The mixture was heated in an autoclave to 190° C. for about 48 hours to afford the product, which is separated by filtration, dried under vacuum and heated under a flow of nitrogen at 500° C. for 1 hour to provide a material of formula $K_{0.247}Na_{0.083}Zr_{0.03}W_{0.97}O_3$ as suggested by XRF analysis.

Comparative Example 8—Sodium Reference

Sodium tungstate dihydrate (6.6 g, 0.02 mol) was dissolved in DI water to a volume of 100 ml. This solution was passed through a column of acid form cation exchange resin to form tungstic acid. 90% Lactic acid (6.0 g) was added to give a clear, colourless solution. Sodium carbonate (0.7 g, $6.6 \times 10^{-3}$ mol) was added to form a clear colourless solution. This solution was transferred to a hydrothermal reactor (volume 200 ml), which was heated to 190° C. for 48 hours. The blue product was separated by filtration, washed with water, then dried under vacuum at 40° C. The afforded solid was then annealed at 500° C. for 1 hour under a flow of $N_2$. A material of expected formula $Na_{0.33}WO_3$ was provided.

Comparative Example 9—Germanium Reference

Sodium tungstate dihydrate (6.6 g, 0.02 mol) was dissolved in DI water to a volume of 100 ml. This solution was passed through a column of acid form cation exchange resin to form tungstic acid. 80% Lactic acid (6.6 g) was added to give a clear, colourless solution. Germanium (0.29 g, 0.004 mol) was added. This mixture was transferred to a hydrothermal reactor (volume 200 ml), which was heated to 190° C. for 48 hours. The blue product was separated by filtration, washed with water, then dried under vacuum at 40° C. The afforded solid was then annealed at 500° C. for 1 hour under a flow of $N_2$.

Comparative Example 10—Lead Reference

Sodium tungstate solution (6.6 g in 100 ml water) was passed through an ion exchange column to form tungstic acid. Lactic acid (80%, 6.6 g) was added, followed by lead nitrate (2.25 g). The mixture was heated in an autoclave to 190° C. for about 72 hours to afford the product, which is separated by filtration, dried under vacuum and heated under a flow of nitrogen at 500° C. for 1 hour to provide a material of expected formula $Pb_{0.33}WO_3$.

Example 1—Li

Sodium tungstate dihydrate (6.6 g, 0.02 mol) was dissolved in deionised water to a total volume of 100 ml. This solution was passed through an acid form ion exchange resin to produce tungstic acid solution. To this, 6.0 g 90% lactic acid solution was added, followed by lithium carbonate (0.27 g, 0.00365 mol) and tin (0.36 g, 0.00303 mol). The suspension was transferred to a 200 ml hydrothermal reaction bomb. This was heated to 190° C. for 48 hours to afford the product which is separated by filtration, dried under vacuum and heated under a flow of nitrogen at 500° C. for 1 hour to provide a material of expected formula $Li_{0.18}Sn_{0.15}WO_3$.

Example 2—Na

Sodium tungstate dihydrate (6.6 g, 0.02 mol) was dissolved in deionised water to a total volume of 100 ml. This solution was passed through an acid form ion exchange resin to produce tungstic acid solution. To this, 6.0 g 90% lactic acid solution was added, followed by sodium carbonate (0.383 g, 0.00361 mol) and tin (0.36 g, 0.00303 mol). The suspension was transferred to a 200 ml hydrothermal reaction bomb. This was heated to 190° C. for 48 hours to afford the product which is separated by filtration, dried under vacuum and heated under a flow of nitrogen at 500° C. for 1 hour to provide a material of formula $Na_{0.18}Sn_{0.15}WO_3$. The composition was confirmed by x-ray fluorescence spectroscopy.

Example 3—K

Sodium tungstate dihydrate (6.6 g, 0.02 mol) was dissolved in deionised water to a total volume of 100 ml. This solution was passed through an acid form ion exchange resin to produce tungstic acid solution. To this, 6.0 g 90% lactic acid solution was added, followed by potassium carbonate (0.50 g, 0.00362 mol) and tin (0.36 g, 0.00303 mol). The suspension was transferred to a 200 ml hydrothermal reaction bomb. This was heated to 190° C. for 24 hours to afford the product which is separated by filtration, dried under vacuum and heated under a flow of nitrogen at 500° C. for 1 hour to provide a material of formula $K_{0.18}Sn_{0.15}WO_3$. The composition was confirmed by x-ray fluorescence spectroscopy.

Example 4—Rb

Sodium tungstate dihydrate (6.6 g, 0.02 mol) was dissolved in deionised water to a total volume of 100 ml. This solution was passed through an acid form ion exchange resin to produce tungstic acid solution. To this, 6.0 g 90% lactic acid solution was added, followed by rubidium carbonate (0.83 g, 0.00359 mol) and tin (0.384 g, 0.00323 mol). The suspension was transferred to a 200 ml hydrothermal reaction bomb. This was heated to 190° C. for 48 hours to afford the product which is separated by filtration, dried under vacuum and heated under a flow of nitrogen at 500° C. for 1 hour to provide a material of formula $Rb_{0.6}Sn_{0.16}WO_3$. The composition was confirmed by x-ray fluorescence spectroscopy.

Example 5—Cs

Sodium tungstate dihydrate (6.6 g, 0.02 mol) was dissolved in deionised water to a total volume of 100 ml. This solution was passed through an acid form ion exchange resin to produce tungstic acid solution. To this, 6.0 g 90% lactic acid solution was added, followed by caesium carbonate (1.19 g, 0.00365 mol) and tin (0.36 g, 0.00303 mol). The suspension was transferred to a 200 ml hydrothermal reaction bomb. This was heated to 190° C. for 48 hours to afford the product which is separated by filtration, dried under vacuum and heated under a flow of nitrogen at 500° C. for 1 hour to provide a material of formula $Cs_{0.18}Sn_{0.15}WO_3$. The composition was confirmed by x-ray fluorescence spectroscopy.

Example 6—NH$_4$

Sodium tungstate solution (6.6 g in 100 ml water) was passed through an ion exchange column to form tungstic acid. Lactic acid (90%, 6.03 g, Alfa Aesar) was added, followed by ammonium bicarbonate (0.57 g, VWR International), and tin powder (0.36 g). The mixture was heated in an autoclave to 150° C. for about 48 hours to afford the product, which is separated by filtration, dried under vacuum and heated under a flow of nitrogen at 500° C. for 1 hour to provide a material of expected formula $(NH_4)_{0.18}Sn_{0.15}WO_3$. XPS data indicates that the oxygen content is from 2.7 to 3.1, and that the tin content is 0.15. Kjeldahl analysis showed the presence of ammonium in the material at a level of at least 0.04. It is noted that the material is defined as having "a minimum content" of ammonium due to the insolubility of the material. It is well-known in the field that for Kjeldahl analysis where a product is not fully soluble this can lead to a result showing lower ammonium content than expected, or shown in other methods of analysis. This the amount of ammonium measured in the sample is defined as ammonium content. For the material of Example 6, the ammonium dopant was added in excess and the applicant has no reason to believe that the interstitial sites in the tungsten oxide are not filled. Furthermore, the IR absorbance performance which is described below for the material of Example 6 is consistent with a high level of doping. Thus it is expected that the level of ammonium is from 0.04 to 0.18; and more particularly, it is expected that the level of ammonium is 0.18.

Example 7—Sodium Ammonium Example

A metal tungstate (such as sodium tungstate [3.34 g]), ammonium metatungstate [2.25 g], and lactic acid (90%, 6.03 g) are dissolved to a clear solution, tin (0.36 g) and then sulfuric acid is added to a pH of 1.1. The mixture is then heated in an autoclave at 190° C. for 40 hours. The solid product is separated by filtration, dried under vacuum, then heated under a nitrogen flow at 500° C. for 1 hour. The resulting tungsten oxide was of formula $Na_{0.19}(NH_4)_{0.03}Sn_{0.11}WO_3$. The tin and sodium content were measured using XRF. It is expected that the sodium content here is a maximum content, and may be slightly lower than measured using XRF. Kjeldahl analysis showed a minimum ammonium content of 0.03, and may be slightly higher, given that the material of Example 7 was not completely soluble in the solvent used which would tend to produce a lower than expected measurement in the Kjeldahl analysis. The total content of sodium, ammonium and tin is expected to be about 0.33.

Example 8—Caesium Example

Sodium molybdate (0.48 g) and sodium tungstate dihydrate (12.53 g) were dissolved in 50 ml water and lactic acid (13.5 g) added. Caesium carbonate (2.68 g) was then added to form a clear and colourless solution. 10% sulfuric acid was added dropwise to a pH of 1.1. Tin powder (0.522 g) was then added. The mixture was heated in an autoclave to 190° C. for about 48 hours to afford the product, which is separated by filtration, dried under vacuum and heated under a flow of nitrogen at 500° C. for 1 hour to provide a material of expected formula $Cs_{0.22}Sn_{0.11}Mo_{0.03}W_{0.97}O_3$. Example 8 demonstrates that Mo can be incorporated into the lattice as a replacement for W.

Example 9—Further Caesium Example

Caesium carbonate (0.24 g) and niobium oxide (0.08 g) were fused at 800° C. to form a clear melt. This melt was dissolved in 20 ml water to form a colourless solution. Further caesium carbonate (1.10 g) was added, followed by lactic acid (6.75 g). Sodium tungstate dihydrate (6.40 g) was dissolved in 80 ml of water and passed through an ion exchange column to form tungstic acid. The caesium niobate solution was then added dropwise with stirring to the tungstic acid solution. Tin powder (0.264 g) was then added. The mixture was heated in an autoclave to 190° C. for about 48 hours to afford the product, which is separated by filtration, dried under vacuum and heated under a flow of nitrogen at 500° C. for 1 hour to provide a material of expected formula $Cs_{0.22}Sn_{0.11}Nb_{0.03}W_{0.97}O_3$. Example 9 demonstrates that Nb can be incorporated into the lattice as a replacement for W.

Example 10—Potassium/Sodium Example

Zirconium oxide (0.136 g) was dissolved in lactic acid (12.0 g). Sodium tungstate dihydrate (11.760 g) was dissolved in 50 ml water. The zirconium lactate solution was added to the sodium tungstate solution to form a clear, colourless solution. Potassium carbonate (1.140 g) was then added. 10% sulfuric acid was added dropwise to a pH of 1.1. Tin powder (0.484 g) was then added. The mixture was heated in an autoclave to 190° C. for about 48 hours to afford the product, which is separated by filtration, dried under vacuum and heated under a flow of nitrogen at 500° C. for 1 hour to provide a material of formula $K_{0.165}Na_{0.055}Sn_{0.11}Zr_{0.03}W_{0.97}O_3$ as suggested by XRF analysis. Example 10 demonstrates that Zr can be incorporated into the lattice as a replacement for W.

Example 11—Ammonium Example, but With Lead Instead of Tin

Sodium tungstate solution (6.6 g in 100 ml water) was passed through an ion exchange column to form tungstic acid. Lactic acid (80%, 6.6 g) was added, followed by ammonium bicarbonate (0.54 g) and lead nitrate (1.13 g, VWR). The mixture was heated in an autoclave to 190° C. for about 72 hours to afford the product, which is separated by filtration, dried under vacuum and heated under a flow of nitrogen at 500° C. for 1 hour to provide a material of expected formula $(NH_4)_{0.165}Pb_{0.165}WO_3$.

Example 12—Caesium Example, but With Germanium Instead of Tin

Sodium tungstate dihydrate (13.3 g, 0.04 mol) was dissolved in deionised water to a total volume of 50 ml. To this, 13.5 g 80% lactic acid solution was added, followed by caesium carbonate (2.64 g, 0.0081 mol). 10% sulfuric acid was added to a pH of 1.1. The suspension was transferred to a 200 ml hydrothermal reaction bomb and germanium (0.32 g, 0.0044 mol) added. This was heated to 190° C. for 48 hours to afford the product which is separated by filtration, dried under vacuum and heated under a flow of nitrogen at 500° C. for 1 hour to provide a material of formula $Cs_{0.22}Ge_{0.11}WO_3$. The composition was confirmed by x-ray fluorescence spectroscopy.

Example 13—Potassium Example, but With Antimony Instead of Tin

Sodium tungstate dihydrate (10.00 g) and potassium tungstate (3.33 g) were dissolved in 50 ml water and lactic acid (13.5 g) added. 10% sulfuric acid was added dropwise to a pH of 1.1. Antimony powder (0.54 g) was then added. The mixture was heated in an autoclave to 190° C. for about 48 hours to afford the product, which is separated by filtration, dried under vacuum and heated under a flow of nitrogen at 500° C. for 1 hour to provide a material of expected formula $K_{0.22}Sb_{0.11}WO_3$.

X-ray diffraction experiments were performed on powder samples of Examples 5, 6, 8 and 9 at room temperature using a Bruker D8 Advance diffractometer (Cu $K_\alpha$ radiation, 1.54 Å wavelength, tube operated at 40 kV, 40 mA) over a 2-theta range of 5 to 85 degrees. All samples were found to generate diffraction patterns consistent with single phase materials.

The infra-red absorption characteristics of the materials of the Examples and the Comparative Examples were examined as described below. The respective material was dispersed at a concentration of 0.01% w/v in deionised water. Those skilled in the art will realise that % w/v is calculated based on the weight of the infra-red absorbing material in grams per 100 ml of deionised water. The IR absorbance characteristics of the suspensions were measured at a nominal wavelength of 1039 nm using a Hach DR2000 or Hach DR3900 spectrometer, a cell of 10 mm path length and a reference sample provided with deionised water. The absorbance measurements are shown in Table 1:

TABLE 1

| Sample | Absorbance (Arbitrary Units) @ nominal 1039 nm |
|---|---|
| Comparative Example 1 | 1.43 |
| Comparative Example 2 | 0.60 |
| Comparative Example 3 | 1.33 |
| Comparative Example 4 | 0.56 |
| Comparative Example 5 | 1.23 |
| Comparative Example 6 | 0.81 |
| Comparative Example 7 | 0.13 |
| Comparative Example 8 | 0.31 |
| Comparative Example 9 | 0.96 |
| Comparative Example 10 | 0.90 |

TABLE 1-continued

| Sample | Absorbance (Arbitrary Units) @ nominal 1039 nm |
|---|---|
| Example 1 | 1.63 |
| Example 2 | 1.95 |
| Example 3 | 2.27 |
| Example 4 | 2.01 |
| Example 5 | 2.09 |
| Example 6 | 1.86 |
| Example 7 | 2.01 |
| Example 8 | 1.77 |
| Example 9 | 1.58 |
| Example 10 | 1.63 |
| Example 11 | 1.13 |
| Example 12 | 2.01 |
| Example 13 | 1.55 |

It can be seen from Table 1 that the absorbance at 1039 nm is generally higher for the materials of the present invention than for the materials of the Comparative Examples. This is indicative of superior IR absorbing properties which may be of particular benefit to provide effective infra-red heat shielding characteristics. Furthermore, more specific comparisons may be made. For example, Examples 8 to 10 correspond to Comparative Examples 5 to 7, but with tin replacing some of the Group I metal in the material. Furthermore, the IR absorbance data from Examples 1 to 6 (Group I metals or ammonium, in addition to tin, being doped into the tungsten oxide) show better IR absorbance data than Comparative Examples 1 which is for tin alone. The IR absorbance data for Comparative Example 4 and Example 11 show that replacing some of the ammonium with lead provides improved IR absorbance performance. The IR absorbance data for Comparative Example 3 and Example 12 show that replacing some of the caesium with germanium provides dramatically improved IR absorbance performance.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above show the use of Group I metals with tin. Those skilled in the art will realise that Group II metals or any of Cu, Tl, In and Ag could be used.

The examples above show the use of one Group I metal with tin. Those skilled in the art will realise that more than one Group I metal may be used.

The examples above show the use of ammonium in examples of the material in accordance with the present invention. Those skilled in the art will realise that other polyatomic species may be used.

The examples above show the use of tungsten oxide in which there are no substituents in the lattice for O. CN103449526A teaches how halogen species can be incorporated into the lattice as a substituent for O.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

Moreover, it is to be understood that such optional integers or features, whilst of possible benefit in some embodiments of the invention, may not be desirable, and may therefore be absent, in other embodiments.

The invention claimed is:

1. A tungsten oxide consisting of Formula (I)

$$M_yT_xQ_vW_{1-v}O_z \qquad (I)$$

wherein:
T represents one of tin, lead, germanium and antimony, T being present in the interstitial spaces or voids of the lattice,
M represents one or more species, each selected from the group consisting of (i) metals other than T, and (ii) polyatomic ionic species, said polyatomic species having an ionic radius of no more than 2 Å, M being present in the interstitial spaces or voids of the lattice,
W is tungsten,
O is oxygen,
Q represents one or more element having an oxidation state of at least +4, Q, if present, occupying a lattice point of W,
v is from 0 to 1.0, y is non-zero and up to and including 0.32, x is non-zero and up to and including 0.32, and z is from 2.5 to 4, provided that x+y≤0.33.

2. The tungsten oxide according to claim 1 in which T represents tin or lead.

3. The tungsten oxide according to claim 1 in which v is 0 to 0.05.

4. The tungsten oxide according to claim 3 in which v is 0 or 0.01 to 0.03.

5. The tungsten oxide according to claim 1 in which v is non-zero and Q comprises one or more of Nb, Mo, Ta, Sn, Ti, Zr, Hf, V, Re, Bi, Sb, As, P, Pb, Ge, Si, U and Mn.

6. The tungsten oxide according to claim 5 in which Q comprises one or more of Nb, Mo, Ta, Sn, Ti, Zr, Hf, Sb, As and P.

7. The tungsten oxide according to claim 1 in which x is at least 0.02.

8. The tungsten oxide according to claim 7 in which x is no more than 0.20.

9. The tungsten oxide according to claim 1 in which y is at least 0.05.

10. The tungsten oxide according to claim 9 in which y is no more than 0.30.

11. The tungsten oxide according to claim 1 in which M represents one or more of: alkali metal, alkaline earth metal, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, Te, Ti, Nb, V, Mo, Ta, Re, Be, Hf, Os, Bi and a polyatomic ionic species having an ionic radius of no more than 2 Å.

12. The tungsten oxide according to claim 1 in which M comprises one or more Group I metal, and/or one or more of Ag, Tl, In and Cu, and/or a polyatomic species having an ionic radius of no more than 2A.

13. The tungsten oxide according to claim 1 in which z is from 2.9 to 3.1.

14. The tungsten oxide according to claim 1 in which x is from 0.03 to 0.13, v is from 0 to 0.04, Q is Nb, Mo or Ta, z is from 2.9 to 3.1, y is from 0.20 to 0.30 and M represents one or more of Na, K, Cs and ammonium.

15. The tungsten oxide according to claim 14 in which x is from 0.05 to 0.11; v is 0, 0.02 or 0.03; z is 3.0; y is from 0.22 to 0.28 and M is one of Na, K, Cs and ammonium.

16. A composition comprising the tungsten oxide according to claim 1 dispersed in a carrier.

17. A method of making the tungsten oxide according to claim 1, the method comprising providing in admixture species T or a source thereof, species M or a source thereof, species Q or a source thereof if present, and a source of $WO_{z-t}$.

18. A method of providing infrared absorbing capability to an object, the method comprising providing said object with the tungsten oxide according to claim 1.

19. The tungsten oxide according to claim 1, wherein T represents germanium or antimony.

\* \* \* \* \*